No. 891,103. PATENTED JUNE 16, 1908.
M. M. SCHANEY.
HOLDER FOR FISHING TACKLE.
APPLICATION FILED APR. 25, 1908.
2 SHEETS—SHEET 1.
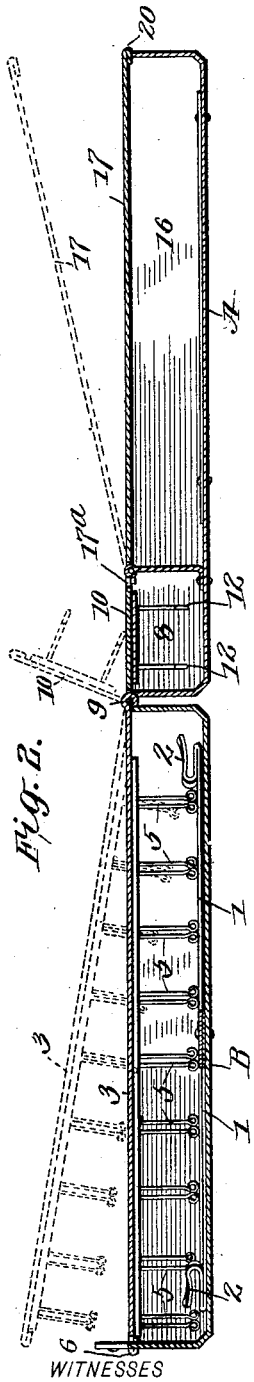
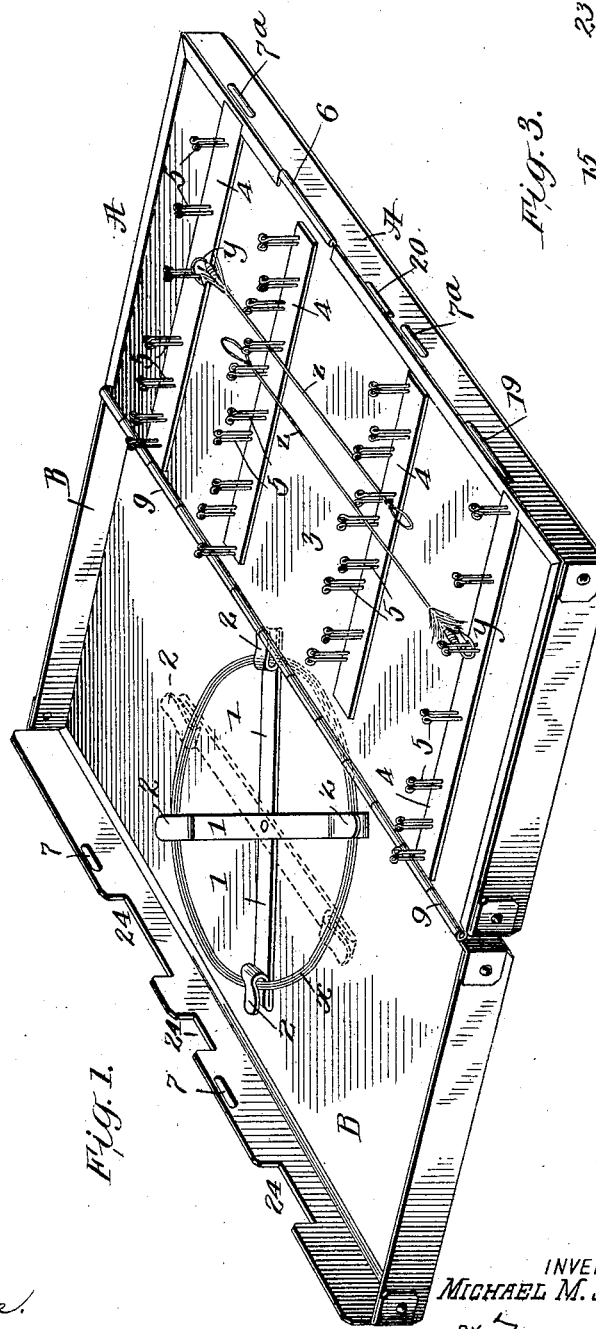
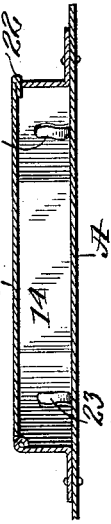
WITNESSES
Samuel E. Wade
Amos W. Hart
INVENTOR
MICHAEL M. SCHANEY.
BY Munn & Co.
ATTORNEYS

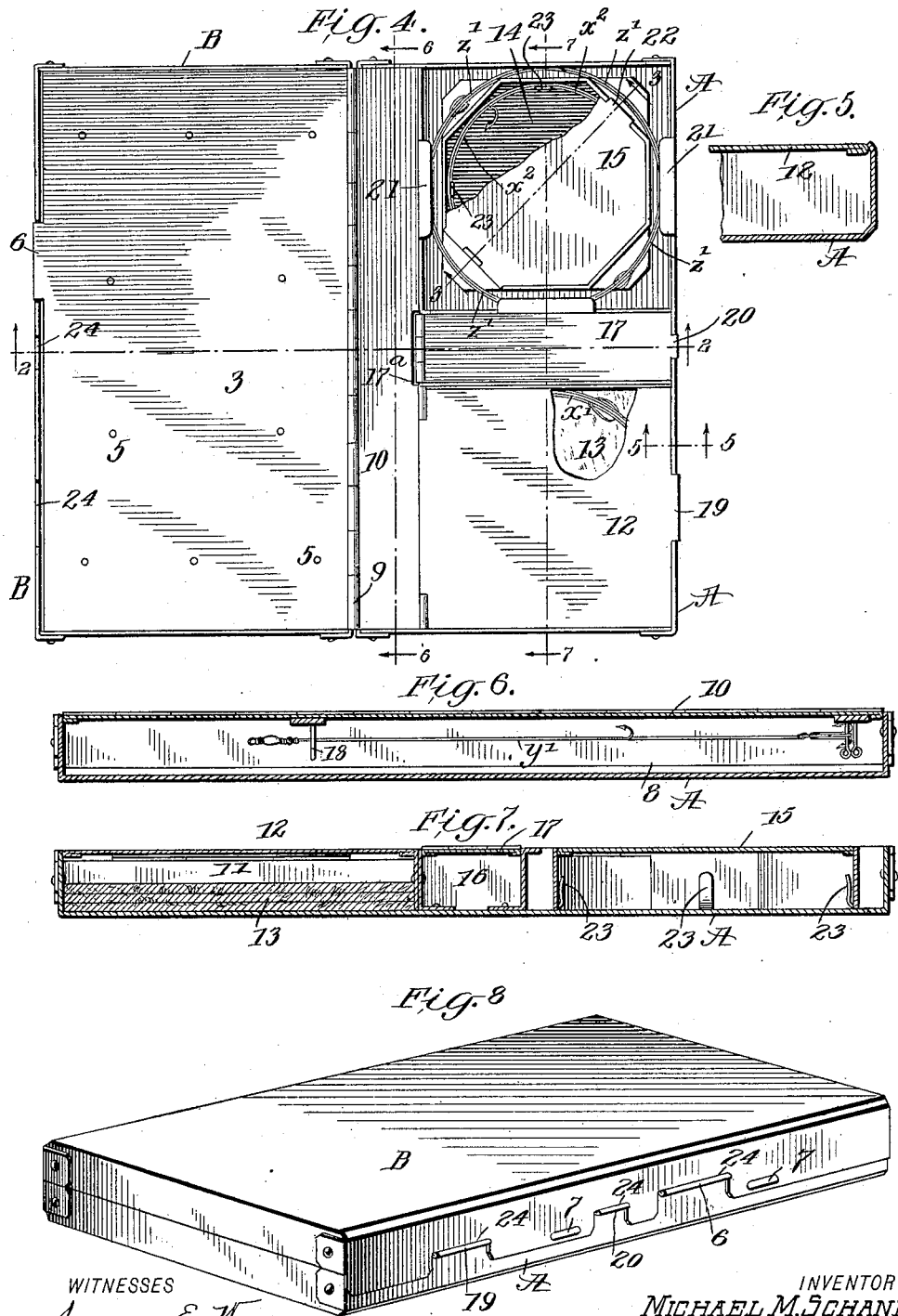

UNITED STATES PATENT OFFICE.

MICHAEL M. SCHANEY, OF DUBOIS, PENNSYLVANIA.

HOLDER FOR FISHING-TACKLE.

No. 891,103.      Specification of Letters Patent.      Patented June 16, 1908.

Application filed April 25, 1908. Serial No. 429,158.

*To all whom it may concern:*

Be it known that I, MICHAEL M. SCHANEY, a citizen of the United States, residing at Dubois, in the county of Clearfield, State of Pennsylvania, have invented an Improvement in Holders for Fishing-Tackle, of which the following is a specification.

The object of my invention is to provide an improved tackle-holder for use of anglers, the same including an improved holder for artificial flies whereby they are held securely and without pressure or injury, but may be easily and quickly detached, also a compartment for leaders and moistening pads, and compartments and supports for snelled-hooks, minnow hooks or gangs, trolling spoon, and artificial minnows.

The details of construction, arrangement, and combination of parts are as hereinafter described, and illustrated in the accompanying drawings, in which Figure 1 is a perspective view of my improved tackle-holder in the open position, the fly-holder proper being shown uppermost. Fig. 2 is a longitudinal section of the tackle-holder in the open position, the fly-holder proper being shown closed. Fig. 3 is a detail section on the line 3—3 of Fig. 4. Fig. 4 is a plan view of the tackle-holder in the open position, all the lids or hinged portions being shown closed, and a portion of the lid of the snelled-hook receptacle being broken away. Fig. 5 is a detail section on the line 5—5 of Fig. 4. Fig. 6 is a longitudinal section on the line 6—6 of Fig. 4. Fig. 7 is a transverse section on the line 7—7 of Fig. 4. Fig. 8 is a perspective view of a tackle holder closed.

My tackle holder is constructed in box form, it being oblong and rectangular and composed of two parts A and B which are hinged together at the back, the part A being the base or bottom, and the part B the cover. These parts, as well as all the others arranged interiorly thereof, are constructed of thin sheet metal, preferably aluminum, on account of its lightness and non-corrosive quality.

Referring to Figs. 1 and 2, on the inside of the cover B, there is arranged what may be called a line-reel, the same being composed of two bars 1—1, which are riveted together and to the cover at the middle of their length. The rivet or other pivot draws them together with friction, which enables them to maintain the position to which they may be adjusted. The ends of each bar 1 are provided with reversely curved hooks 2, which serve to receive a line $x$, as shown in Fig. 1.

The dotted lines indicate the position to which one of the hooked bars 1 may be adjusted when a line is to be wound on the reel, and the full lines indicate the position to which such bars will be turned for the purpose of tightening the line in place. A plate 3 is hinged at 9, where the two parts A, B are also hinged together, and is adapted to fold into cover B. This plate is provided on its inner side with a series of transverse bars 4 and pairs of springs 5 which serve to hold artificial flies. That is to say, each pair of springs is fixed in the bars 4 at right angles thereto, the same being formed of spring wire and the heads or free ends being turned to form an eye. The heads are normally pressed together, and the hook $y$ and snood $z$ of an artificial fly may be readily pressed down between them. Thus both hook and snood are prevented from becoming detached in the conditions of ordinary use, but may be readily detached by simply seizing the snood or its loop between the thumb and finger and pulling upward when the plate 3 is in open position shown in Fig. 1. In Fig. 2, this plate, together with the spring holders, is shown closed or in the normal position, while dotted lines indicate the same as partly open. The spring holders 5 on the two inner bars are set staggering or out of transverse alinement with each other, as shown, whereby more space is provided for a long stretch of the snoods from the end or outer spring holders which are farthest removed. The plate 3 to which the spring holders 5 are attached, is provided at its free edge with a projecting portion 6 (see Figs. 1 and 2) which engages a notched portion of the side edge of cover. The latter is also provided with spring catches 7 that are adapted to engage projections or struck-up portions $7^a$ of the edge of the bottom, or base A, for holding the cover closed detachably.

The base or bottom A is provided with four compartments, to wit—a narrow elongated compartment adjacent to the hinge 9 and provided with a hinged cover 10 (see Figs. 2, 4, 6); a rectangular compartment 11 having a cover 12 (see Figs. 4 and 7) and adapted to receive moistening pads 13, for leaders $x'$ (see Fig. 4); an octagonal compartment 14 having a hinged cover 15 and an intervening, narrow, transverse compartment 16 having a hinged cover 17. The cover 10 of long, narrow compartment 8 is provided with pendent spring devices 18 (see Figs. 2 and 6) which serve to hold minnow gangs $y'$, also extra ferrules, rod tips, or other devices useful to the angler. The cover 12 of the rectangular compartment 11 containing the moistening pads 13 before referred to, is provided with a catch 19, the same being formed by turning over a projecting portion of the free edge of the cover so that it may be engaged by the side of the base A.

The narrow transverse middle compartment 16 has a cover 17 hinged at the free edge of the hinged cover 10 of the long compartment 8, and provided with a spring catch 20 similar to the catch of the adjacent cover 12. This chamber or compartment 16 is adapted to receive artificial minnows, sinkers, or other separate parts of the fisherman's outfit. The cover 10 of the long compartment 8 is cut away at $17^a$, adjacent to the hinge of cover 17, as shown in Fig. 4, whereby space is provided for insertion of a finger nail for opening the cover 10 and also for accommodation of the hinge or cover 17 so that the latter may be turned back as required to fully open the compartment 16. The octagonal chamber 14 is formed by means of a vertical flange which is spaced from the adjacent walls or sides of the box base A, such space serving in practice to receive snelled-hooks or leaders $z'$ as shown in Fig. 4. The opposite sides of the base A are provided with inwardly projecting flanges 21 which serve to prevent the hooks or leaders from getting out of place. The cover 15 of the box or compartment 14 is provided with a catch 22 similar to the catches 19 and 20 of the covers of compartments 11 and 16 already described. Within the compartment 14 adjacent to several of its sides, there are spring clasps or clips 23 provided as shown in Figs. 3 and 4 and 7, the same serving to hold snooded hooks $x^2$ in place. It is apparent that the snoods will be slipped down between the clasps and adjacent side of the compartment and that the resiliency of the clasps will hold them in place; thus one bait-hook or snooded-hook may be instantly removed without interfering with those below. Adjacent to the spring catches 7, $7^a$, before referred to, which serve to secure the cover B to the base A, the cover flange is cut away or notched, as indicated at 24 (see Fig. 8), which provides space for projection of the fastening 6 of plate 3 and of the catches 19 and 20 of covers 12 and 17.

By means of the construction described, that is to say, by means of the several compartments arranged as specified and the holders for flies, hooks, leaders, and other devices, I provide a tackle-box which is very convenient and reliable in use and which protects the contents, particularly the flies, so that they are kept dry and clean and uninjured.

Another special feature of excellence is the adaptation of the holders for the flies, and bait, and other hooks to permit instant removal of said flies or hooks without disturbing others which underlie them or are laterally adjacent thereto.

What I claim is:

1. The improved tackle-box comprising two parts hinged together one serving as a cover and having a reel secured to it interiorly, the said reel comprising two bars provided with hooks and riveted together so that they may be turned on each other, substantially as described.

2. The improved tackle-box comprising two parts hinged together and one of them having a cover plate 3 provided with series of spring holders for flies and snooded-hooks, the same being formed of spring wire secured to the said plate, and their ends turned outwardly, but abutting, as shown and described.

3. The improved tackle-box composed of two parts hinged together and having a plate hinged at their joint and provided with a series of rows of spring holders for flies and snooded-hooks, the said holders being formed of spring wire and arranged in pairs and the two inner rows being arranged staggering.

4. The improved tackle-box composed of two parts hinged together and the base part provided with a compartment whose side consists of a rim 23 which is spaced from the sides of said base part and the latter having inwardly projecting flanges 21, whereby a space is provided for reception of leaders or hooks, in the manner described.

MICHAEL M. SCHANEY.

Witnesses:
  LOUIS E. BOYER,
  M. SPINKLER.